US011144750B2

(12) United States Patent
North

(10) Patent No.: US 11,144,750 B2
(45) Date of Patent: Oct. 12, 2021

(54) ASSOCIATION TRAINING RELATED TO HUMAN FACES

(71) Applicant: Family Concepts II, LLC, Escondido, CA (US)

(72) Inventor: Vaughn W. North, Escondido, CA (US)

(73) Assignee: Family Concepts II, LLC, Escondido, CA (US)

( * ) Notice: Subject to any disclaimer, the term of this patent is extended or adjusted under 35 U.S.C. 154(b) by 44 days.

(21) Appl. No.: 16/801,848

(22) Filed: Feb. 26, 2020

(65) Prior Publication Data
US 2020/0279099 A1 Sep. 3, 2020

Related U.S. Application Data

(60) Provisional application No. 62/812,138, filed on Feb. 28, 2019.

(51) Int. Cl.
G06K 9/00 (2006.01)
G06K 9/62 (2006.01)
G06T 13/80 (2011.01)

(52) U.S. Cl.
CPC ..... *G06K 9/00288* (2013.01); *G06K 9/00281* (2013.01); *G06K 9/6257* (2013.01); *G06T 13/80* (2013.01); *G06K 2209/27* (2013.01)

(58) Field of Classification Search
CPC ........... G06K 9/00288; G06K 9/00281; G06K 9/6257; G06K 2209/27; G06T 13/80
See application file for complete search history.

(56) References Cited

U.S. PATENT DOCUMENTS

| 8,285,713 | B2 * | 10/2012 | Luo | G06F 16/583 |
| | | | | 707/723 |
| 9,336,435 | B1 * | 5/2016 | Ozog | G06F 3/0488 |
| 10,013,600 | B2 * | 7/2018 | Chen | G06F 16/5838 |
| 10,027,727 | B1 * | 7/2018 | Ozog | G06K 9/00926 |

(Continued)

OTHER PUBLICATIONS

Andrew; "Our New App, Evernote Hello, Will Help You Remember People;" The Evernote Blog; (Dec. 7, 2011); 7 pages; [retrieved on Jan. 3, 2013]; Retrieved from <URL: https://blog.evernote.com/blog/2011/12/07/our-new-app-evernote-hello-will-help-you-remember-people/ >.

(Continued)

*Primary Examiner* — Wesley J Tucker
(74) *Attorney, Agent, or Firm* — Thorpe North & Western, LLP.

(57) ABSTRACT

Methods and systems for creating a memory recall composite for a face and name association image are described. A first image comprising at least a portion of a subject's face may be received. The first image may be analyzed to determine a set of facial features. A set of objects may be determined and displayed using a set of visual and auditory correspondence rules. An association between a graphical representation of the object and a facial feature may be received. A second image or a memory recall composite may be generated that displays at least a portion of the first image using the graphical representation of the object based in part on the association between the graphical representation of the object and the facial feature associated with the subject's face.

20 Claims, 13 Drawing Sheets

(56) References Cited

U.S. PATENT DOCUMENTS

| | | | |
|---|---|---|---|
| 10,176,379 B1* | 1/2019 | Barton | G06K 9/00288 |
| 2007/0166675 A1 | 7/2007 | Atkins et al. | |
| 2007/0218441 A1 | 9/2007 | Delahunt et al. | |
| 2010/0067750 A1 | 3/2010 | Matsuo et al. | |
| 2011/0312376 A1* | 12/2011 | Woo | H04M 1/27457 |
| | | | 455/556.1 |
| 2012/0114197 A1* | 5/2012 | Zhang | G06F 40/295 |
| | | | 382/118 |
| 2013/0294642 A1* | 11/2013 | Wang | G06K 9/00261 |
| | | | 382/103 |
| 2014/0101617 A1* | 4/2014 | Yang | G06F 3/04817 |
| | | | 715/846 |
| 2014/0294257 A1* | 10/2014 | Tussy | G06F 21/32 |
| | | | 382/118 |
| 2016/0196284 A1* | 7/2016 | Kanda | G06K 9/00248 |
| | | | 707/724 |
| 2017/0098284 A1* | 4/2017 | Schneider | G06Q 50/01 |
| 2020/0050861 A1* | 2/2020 | Wexler | G06T 7/70 |

OTHER PUBLICATIONS

Art of Memory; "Memory Palace Software for Brain Training, Mnemonic Techniques, and Spaced Repetition;" (Nov. 16, 2019); 5 pages; [retrieved on Apr. 1, 2020]; Retrieved from <URL: artofmemory.com/software/ >.

Hedges; "The Five Best Tricks to Remember Names;" Forbes-Women; (Aug. 21, 2013); 5 pages; [retrieved on Apr. 1, 2020]; Retrieved from <URL: https://www.forbes.com/sites/work-in-progress/2013/08/21/the-best-five-tricks-to-remember-names/#759d6698501f >.

Memory Techniques Wiki; "Memorizing Names and Faces;" Art of Memory; (Nov. 16, 2019); 16 pages; [retrieved on Apr. 1, 2020); Retrieved from <URL: https://artofmemory.com/wiki/Memorizing_Names_and_Faces >.

* cited by examiner

ASSOCIATION TRAINING RELATED TO HUMAN FACES

BACKGROUND

The use of digital photography in conjunction with computing resources has provided a proliferation of digital photos being captured. The digital photos are often of people or peoples' faces. Often these photos are obtained using digital cameras located in mobile devices (e.g., mobile phones, tablets, etc.) and the photos may be stored on the mobile devices.

The digital photos may be stored in a data store associated with the digital camera or may be transferred to another data store via a computer network. For example, the digital photos may be stored in a data store associated with a computing system or the digital photos may be stored in network accessible data store in a service provider environment (e.g., a cloud based data store). The computing system may be capable of displaying the digital photo for a user to view.

DETAILED DESCRIPTION

Figure 1:
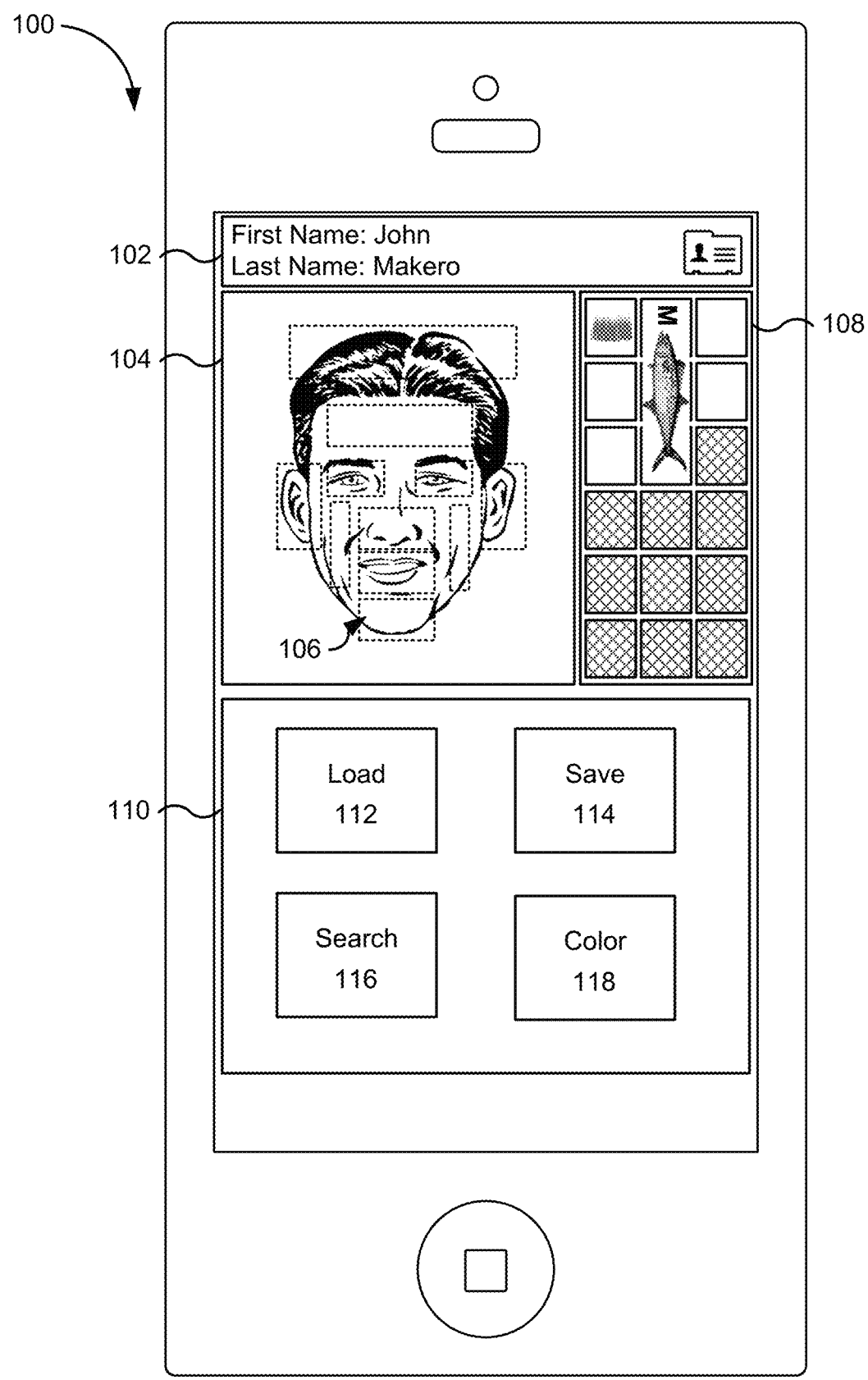
FIG. 1 is a block diagram illustrating a device and user interface used for creating a face and name association image or display in accordance with the present technology.

A technology is described for creating face and name associations for digital images using prominent facial features of a person in the digital image. A face and name association image may also be referred to as a memory recall composite or memory recall composite image. For example, a digital image may capture a person's face. The digital image may be captured using a device, such as a mobile device (e.g., a smart phone). The user that captures the image of a person's face may desire to remember the name of the person captured in the image or some other aspect about the person in the image (e.g., the person's occupation or where the user met the person). The present technology may assist in creating visual associations, such as a memory recall composite, or other associations through a graphical user interface of a computing device to help the user remember some valuable aspect about the person whose face was captured in the digital image. For example, a face and name association (e.g. a memory recall composite) may be described as a mnemonic device that is a visual representation of the person with an altered portrait image or altered features. The altered image or altered features may assist the user in remembering the name of the person or another valuable fact about the person. The altered image may be associated with the name of the person. In one example, the person in the digital image may have the last name of Bell and the image or view of the person is modified to include an image of a bell. The altered image or modified view may actually alter an image of the person's face or feature of the person's face, or may only place the object in proximity to or next to the person's face or layer the object over the person's face without actually altering or modifying the image of the person's face. In one example, the altered image may include an animation involving the image of the person's face and the object.

The digital image may be accessed by a device that displays the altered digital image or modified view of the person's face along with the person's name. The name of the person may be entered by the user of the device or may already be associated with the digital image. The device may display the digital image in a graphical user interface along with other graphical objects or graphical user options in the interface. For example, the interface may include a button that when selected begins a process associated with the present technology to assist in creating face and name associations. Once the button is selected to begin the process, the image of the person's face is displayed along with a set of potential images or graphical objects that could be associated with the person's name. The image of the person's face may also be displayed such that features of the person's face are highlighted or otherwise emphasized. For example, the features highlighted in the person's image may include the user's hair, nose, eyes, ears, chin, etc. The features may be highlighted using a dotted box overlaid on the image such that the feature is contained within the box. The features may be a target location for an object to be overlaid over or near the key feature to generate the image of the person with altered features or an altered image. The image of the person with altered features may be referred to as a face and name association image. In some cases, an outstanding feature of a person may be selected. An outstanding feature may be a feature of a person that different than the average in some way. For example, an outstanding feature may be a distinct hairstyle, a larger nose or different colored hair that is not common.

In one aspect, the present technology is employed to automatically generate the set of potential objects that could be associated with the person's image and/or name. This may be accomplished using various techniques. The potential objects may be objects that are associated with one of the names of the person, have similar letters of the name, or rhyme with the name of the person. For example, if the person's first or last name is Terry, then a related object or image may be of a terry cloth towel. The set of potential objects may be selected using a set of visual and auditory correspondence rules to identify potential objects that correspond to the person's name. The present technology may employ a library of objects that are associated with known name or existing names. The present technology may also build a library or modify a library of objects associated with names. For example, machine learning may be used to build, modify, or improve the library. Each time the present technology is employed by one or more users to create a face and name association, the machine learning may use information from the one or more users as input to modify the library of associations and may also be used as in feedback loop for training the machine learning model.

Once the set of potential objects are displayed along with the person's face, at least one object is selected from the set of potential objects to create the face and name association image also referred to as a memory recall composite. In one aspect, the user selects the object from the set of potential objects and selects a placement of the object in proximity to or over the person's face. This may be accomplished by the user dragging the object to the digital image of the persons face via the graphical user interface. The object may be dragged to a specific feature of the person's face which may be one of the highlighted features. The object can then be combined or blended with the person's face to create a face and name association image. In one embodiment, the selection of one of the potential objects and the placement of the object with respect the person's face is made by a computing process instead of a user.

The face name training may include a learning phase. The learning phase may present a second image transforming or modifying a portion of the subject's image with a graphical representation of an object. The learning phase may visually emphasize the graphical representation of the object or the name data. The learning phase may then perform a testing phase. The testing phase may first present the second image, absent the name data, transforming the portion of the first image with the graphical representation of the object. The testing phase may then visually emphasize the graphical representation of the object. The testing phase may then present a plurality of names including a name associated with the name data of the subject. The testing phase may then receive a selection of at least one of the plurality of names. The testing phase may then present a visual indicator identifying whether the selection corresponds to the name data. The learning phase and the testing phase may be repeated to improve name-face learning of a participant.

Once a specific memory recall composite has been generated and selected for a given person by a user, the specific memory recall composite may be automatically displayed to the user to trigger a memory of the given person. For example, a device may have a contact list with the given person included in the contact list. The device may associate the specific memory recall composite with the contact entry for the given person such that the device may trigger the specific memory recall composite when the contact is selected. The contact may be selected by the user selecting the contact to call or message the contact. The contact may also be selected by the device receiving an incoming call or message from the contact. Thus, the specific memory recall composite may be employed to trigger an automatic display to the user and enable the user to recall the name of the given person based on the specific memory recall composite.

In one embodiment, a memory recall composite may be generated and associated with a given person. The user may subsequently edit the memory recall composite at a later time. For example, after a period of time the user may desire to change a portion or all of the memory recall composite. The change may be based on a change in the user's relationship to the given person, a change in the given person's name, or for no specific reason.

FIG. 1 is a block diagram illustrating a device 100 used for creating a face and name association image in accordance with the present technology. The device 100 may be a computing device that is capable of storing and displaying a digital image in an interface, as well as processing data. The device 100 may be a connected to storage system and a network such as the internet. The device 100 may be, but is not limited to, a mobile device, a smart phone, a tablet, a laptop, a desktop computer, etc. The device 100 is depicted as displaying a user interface associated with the present technology. The user interface may include a name field 102 that is used to display the first name and last name of a person whose image is displayed in the interface. The name field 102 may also display other contact information associated with the person. The interface may also display a digital image 104 of the person. The digital image 104 may display a portion of the person's face or all of the person's face. The digital image 104 may have been captured by a camera associated with the device 100 or may be uploaded to the device from another location. The name displayed in the name field 102 may be entered by the user of the device 100 or may be already associated with the digital image file as metadata. In one aspect, the name field 102 is populated by contact information from a contact list associated with the device 100 and the digital image 104 is selected based on an association with the contact information. There may also be a field for information other than a person's name. For example, the field may have the name of something the user is to remember such as the person's occupation, where the person is from, a geographic landmark, a business name, etc.

The process of the present technology may identify features of the face of the person displayed in the digital image 104. The features may be highlighted or otherwise identified. For example, the digital image 104 highlights the features of the person's face by outlining the key feature with a dotted line in the form of a rectangle or another shape. A feature 106 outlines the chin of the person's face. In one aspect, the features are a set of facial features determined by analyzing the digital image 104 using facial feature detection methods or a set of visual prominence rules.

The present technology may analyze the name of the person in the digital image to populate a set of potential objects 108. This may be accomplished by using a library of name-object associations that already has potential objects associated with known names. The library may also have object associations with other items such as, occupations, geographic landmarks, business names, etc. For example, the name of the person may be rhymed with objects or the name may be similar to the name of an object. The set of potential objects 108 may be images of objects or animations. The animation may be displayed each time the resulting memory recall composite is displayed to the user. The animation may assist the user in recalling the name of the given person. One of the images in the set of potential objects 108 may be an image that invokes a sense such as smell. For example, one of the images of the set of potential objects 108 may be an image of a rose or a skunk that invokes a specific smell to the user. The specific smell may be associated in the mind of the user with a given person.

The smell may be invoked because of the way the given person smells, such as a perfume, or a smell that the user remembers smelling when the user first met the given person. One of the images in the set of potential objects 108 may be an image that invokes a sound.

The set of potential objects 108 may be displayed after the user selects a control button to begin the process. The library may be stored in the device or may be a stored in a remote location that is accessed over a network (e.g., in cloud storage). In one aspect, the objects in the set of potential objects 108 may be filtered or prioritized to determine an order in which objects are to be displayed (e.g., which objects are displayed at the top of the interface). For example, the prioritization may be based on using a set of facial features associated with the subject's face depending in part on whether each object in the set of objects satisfies a relationship with at least one facial feature in the set of facial features. The filtering may be filtering the set of objects into a filtered list of objects using the set of facial features associated with the subject's face based in part on whether each object in the set of objects satisfies a relationship with at least one facial feature in the set of facial features. In one embodiment, the filter may be able to identify prominent facial features in the set of facial features and prioritize the prominent facial features. For example, the filtering may identify that the image of the given person has a nose or ears that are large relative to the rest of the image's features (e.g., using machine learning classification). The large images may then be prioritized in the graphical interface. In one embodiment, the resulting memory recall composite exaggerates one of the prominent facial features of the given person to assist in memory recall of the given person's name.

The interface may also include user controls 110 that are buttons that allow a user to control aspects of the interface and the present technology. The user controls 110 may include buttons for load 112, save 114, search 116, and color 118. For example, if the user desires an object that is not displayed in the set of potential objects 108, the user may employ the user controls 110 to search 116 for the desired objects. The user controls 110 may also be used to load 112 an image into the interface, input name data into the name field 102, save a face and name association image, etc.

In one embodiment, the user interface may also be employed to edit a memory recall composite or face name association after the memory recall composite image has already been generated. For example, the user controls 110 may include options to load 112 an existing memory recall composite and other controls may be used to change, edit, modify, or alter the existing memory recall composite. The edited memory recall composite may then be saved and associated with the contact.

Figure 2:
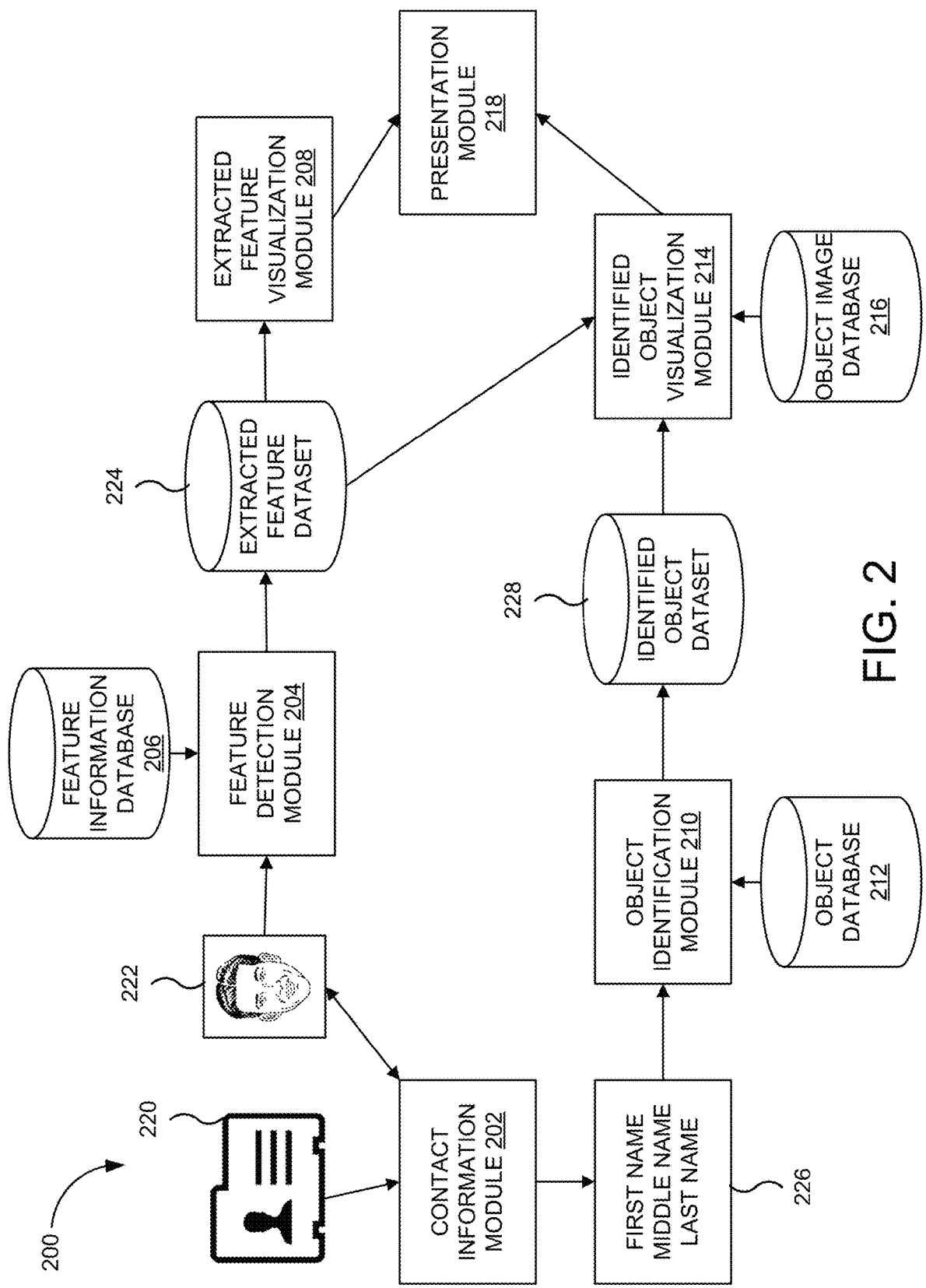
FIG. 2 is a block diagram illustrating a flow for creating a face and name association image or display in accordance with the present technology.

FIG. 2 is a block diagram illustrating a flow for creating a face and name association image in accordance with the present technology. A user contact data store 220 may be accessed by a contact information module 202 to identify name information 226. The name information 226 may include a first name, a middle name, and/or a last name of a person. The name information 226 may be used by an object identification module 210 to identify a set of potential objects associated with the name or names of the person. The object identification module 210 may access an object database 212 to obtain the set of potential objects. The object identification module 210 may then create an identified object dataset 228 with the set of potential objects. The identified object dataset 228 may be accessed by an identified object visualization module 214 to display the set of potential objects 108 in an interface using a presentation module 218. The identified object visualization module 214 may also access an object image database 216.

The contact information module 202 used to obtain the name information 226 may associate the name information 226 with a digital image 222. The digital image 222 may be an image of the person's face. The digital image 222 may be accessed by a feature detection module 204 to create an extracted features dataset 224 containing features of the person's face. This may be accomplished using a feature information database 206 accessed by the feature detection module 204. An extracted feature visualization module 208 may access the extracted features dataset 224 to display the digital image 222 with the extracted features highlighted using the presentation module 218. The presentation module 218 may be the interface described in association with the device 100 of FIG. 1. The identified object visualization module 214 may also access the extracted feature data set 224 to identify potential objects to be included in the set of potential objects displayed using the presentation module 218.

Figure 3:
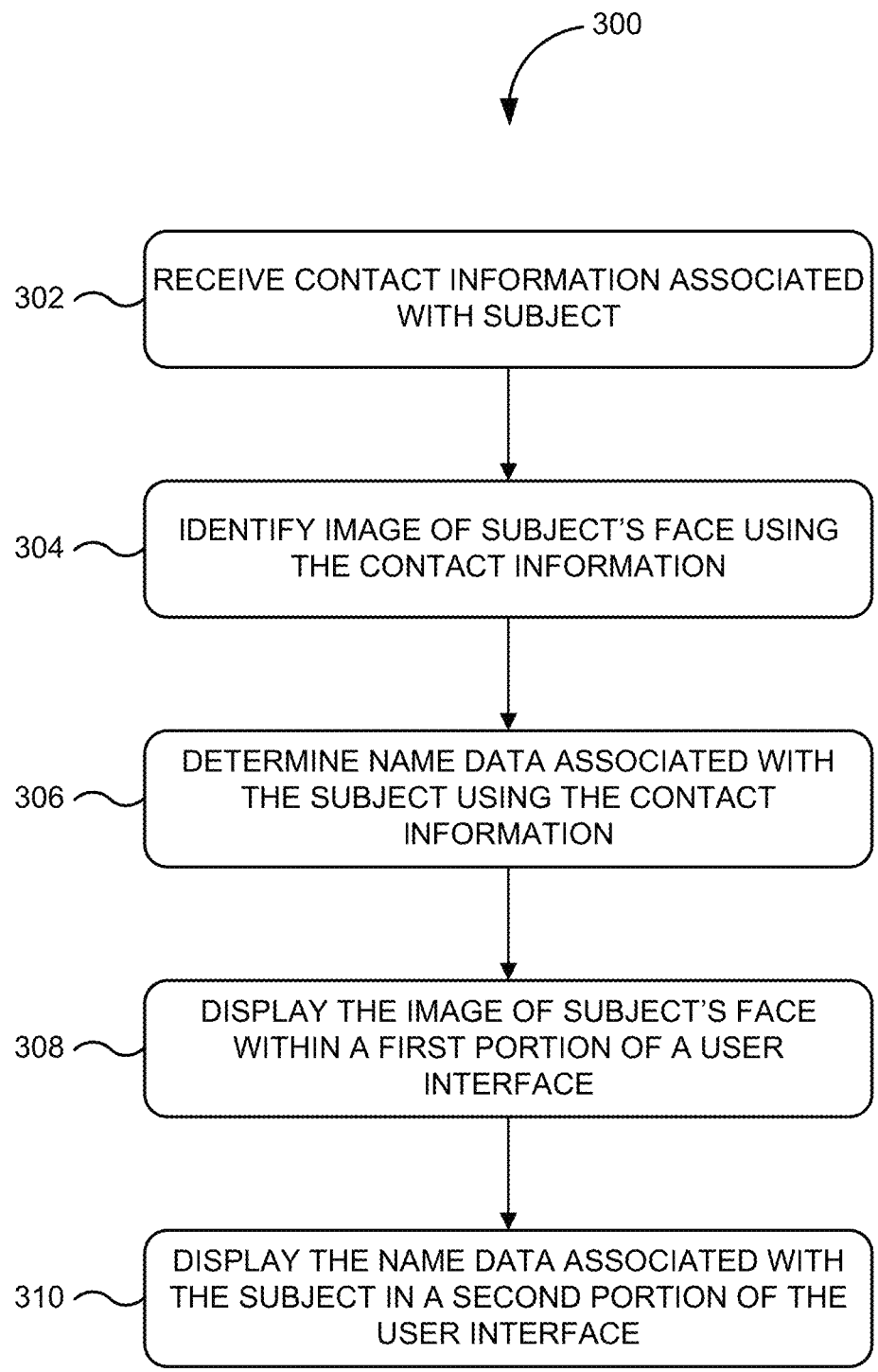
FIG. 3 is a flowchart of an example method for creating a face and name association image and user interface according to an example of the present technology.

FIG. 3 is a flowchart of an example method 300 for setting up an interface for creating a face and name association image according to an example of the present technology. The functionality may be implemented as a method and executed as instructions on a machine, where the instructions are included on at least one computer readable medium or one non-transitory machine-readable storage medium. For example, starting in block 302, contact information associated with the subject may be received.

An image of the subject's face may be identified using the contact information, as in block 304. Name data associated with the subject may be determined using the contact information, as in block 306. The image of the subject's face may be displayed within a first portion of a user interface, as in block 308. The name data associated with the subject may be displayed in a second portion of the user interface, as in block 310.

Figure 4:
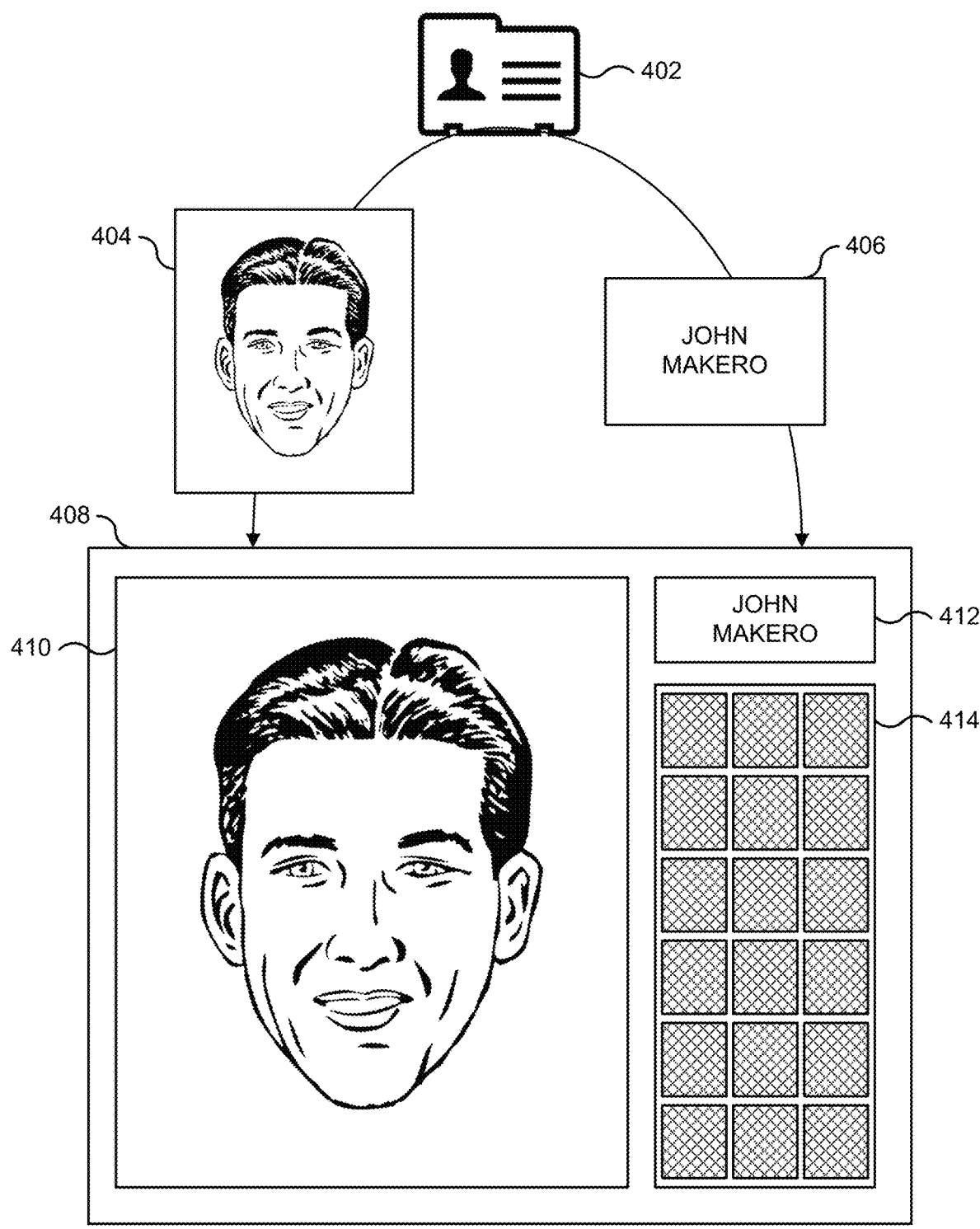
FIG. 4 is a block diagram illustrating a user interface used for creating a face and name association image in accordance with the present technology.

FIG. 4 is a block diagram illustrating an interface 408 used for creating a face and name association image in accordance with the present technology. FIG. 4 depicts contact information 402 which may be contact information associated with a person that is electronically stored. The contact information may be stored using a file type such as a vCard. The contact information may be associated with a user account that has a plurality of contacts having contact information. The contact information 402 may contain name information 406 which includes the names associated with the person. The contact information 402 may be associated with a digital image 404 which may be an image of the person's face or a portion of the person's face. The present technology, in one aspect, may generate the graphical user interface 408 used to create a face and name association image. The interface may include an image display 410 which may initially display the digital image 404. The interface may include a name field 412, which displays the names of the person obtained from the name information 406. The interface 408 may include a set of potential objects 414 which may be visual objects that are potentially associated with the name of the person and/or the person's face.

Figure 5:
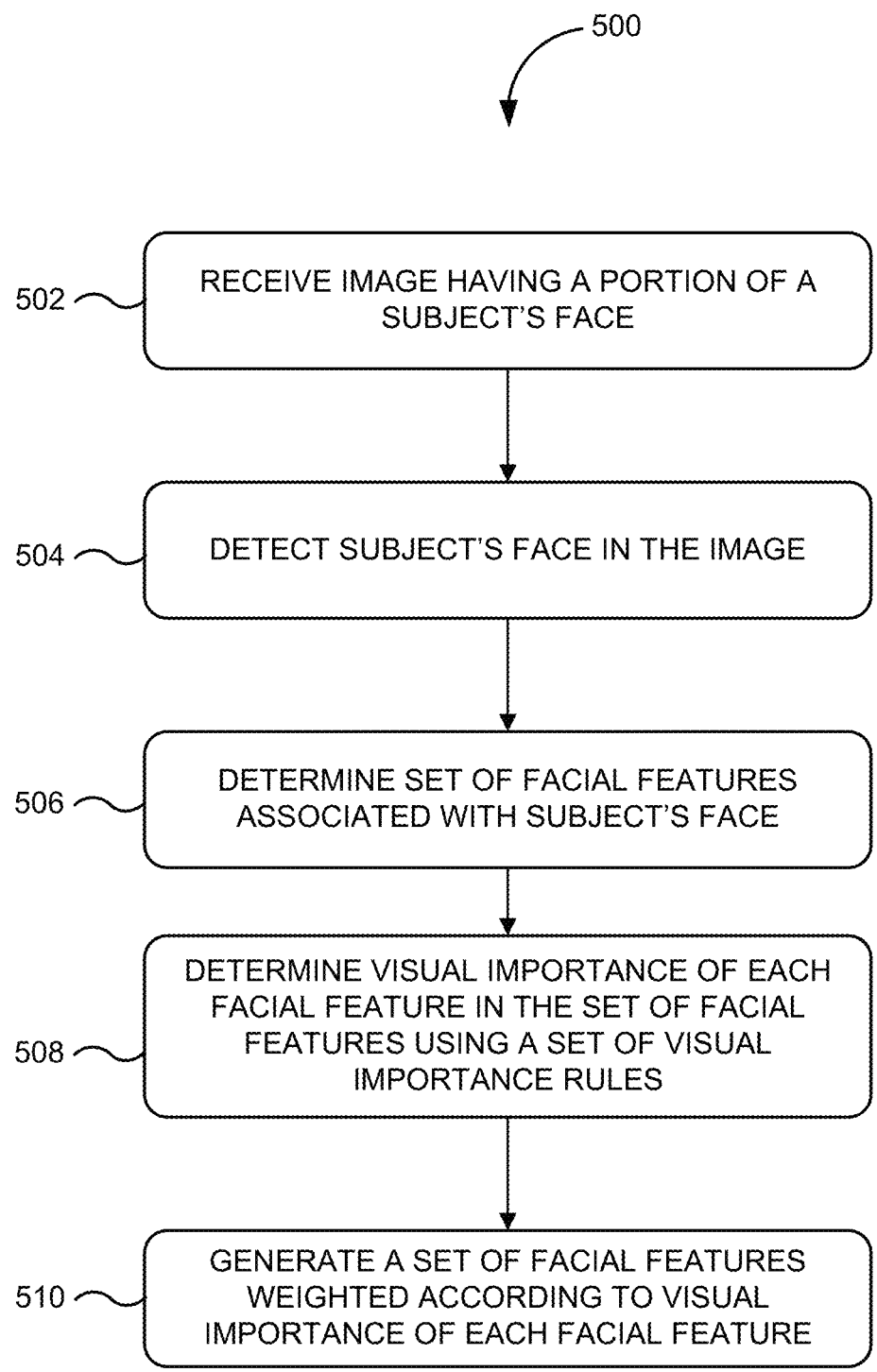
FIG. 5 is a flowchart of an example method for creating a face and name association image or user interface according to an example of the present technology.

FIG. 5 is a flowchart of an example method 500 for creating a face and name association image according to an example of the present technology. The functionality 500 may be implemented as a method and executed as instructions on a machine, where the instructions are included on at least one computer readable medium or one non-transitory machine-readable storage medium. For example, starting in block 502, an image having a portion of the subject's face may be received.

The subject's face may be detected in the image, as in block 504. A set of facial features associated with the subject's face may be determined, as in block 506. Visual importance or prominence of each facial feature in the set of facial features may be determined using a set of visual importance rules, as in block 508. A set of facial features may be generated and weighted according to visual importance of each facial feature, as in block 510.

Figure 6:
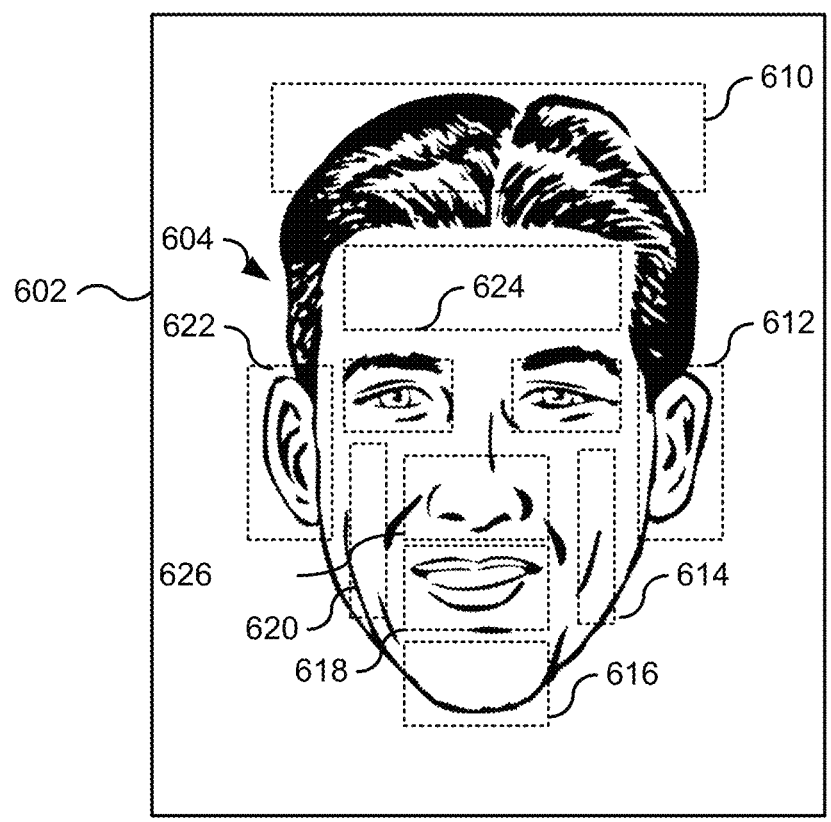
FIG. 6 is a block diagram illustrating a digital image used for creating a face and name association image or user interface in accordance with the present technology.

FIG. 6 is a block diagram illustrating a digital image 602 used for creating a face and name association image in accordance with the present technology. The digital image 602 may include an image of a person's face 604. The image of a person's face 604 may include all of the person's face or a portion of the person's face. A process of the present technology may determine facial features of the person's face as described in process 500 of FIG. 5. For example, the facial features may be features of the person's face that are highlighted in an interface that displays the person's face. The features may be highlighted by imposing lines around or outlining the image. The lines may be of different colors or may be dotted or dashed. The features may be highlighted using other techniques such as changing a contrast, brightness, shading, or color of the key features. In addition, other 2D or 3D graphical shapes (planes, polygons, spheres, cylinders, irregular shapes, etc.) may be used for highlighting the features of a person's face.

FIG. 6 depicts the highlights as dotted lines in the shape of rectangles that outline the key features. Of course, the highlights or regions may be of any shape and size. Box 610 outlines the person's hair. Box 612 outlines the person's left ear. Box 622 outlines the person's right ear. Box 624 outlines the person's forehead. Box 626 outlines the person's nose. Box 614 outlines the person's left cheek. Box 620 outlines the person's right cheek. Box 618 outlines the person's mouth. Box 616 outlines the person's chin. It should be appreciated that some of, all of, or more than the features highlighted in FIG. 6 may highlighted in embodiments of the present technology. The technology may also operate by comparing the shape of a known area with the shape of the detected feature, such as a chin or other feature. The comparison may then find potential images to display to the user with the same shape.

Figure 7:
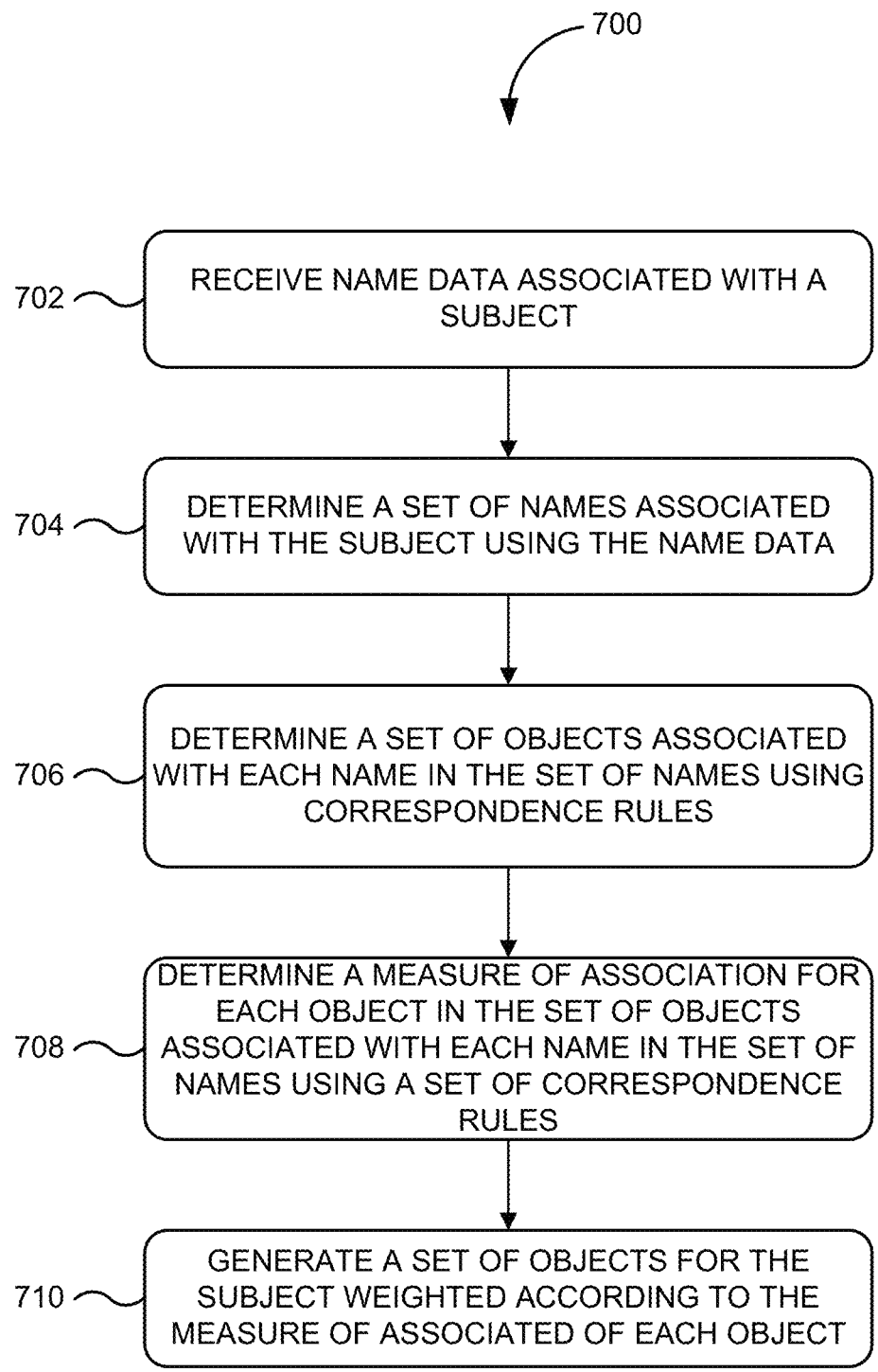
FIG. 7 is a flowchart of an example method for creating a face and name association image or user interface according to an example of the present technology.

FIG. 7 is a flowchart of an example method 700 for creating a face and name association image according to an example of the present technology. The functionality 700 may be implemented as a method and executed as instructions on a machine, where the instructions are included on at least one computer readable medium or one non-transitory machine-readable storage medium. For example, starting in block 702, name data associated with a subject may be received.

A set of names associated with the subject may be determined using the name data, as in block 704. A set of objects associated with each name in the set of names may be determined using correspondence rules, as in block 706. The correspondence rules may be rules associated with sensory input such as visual and auditory correspondence rules. For example, a word may sound like an image of something else, such as the name Lillian may be associated with a lily and so an image of a lily would be appropriate. Other sensory input such as taste, smell, sound, or touch may also be used for the correspondence rules. A measure of association for each object in the set of objects associated with each name in the set of names may be determined using a set of correspondence rules, as in block 708. The measure of association may be a ranking or weighting of the objects in the set of objects. The weighting or ranking may determine a priority as to the order the objects will be displayed to the user. This priority could reflect the degree of similarity or correspondence between the name or information to be remembered and the group of objects, with the highest priority being assigned to the greatest degree of similarity, etc. The weighting or ranking may also be based on machine learning and what objects other users have selected for similar names. Other methods of prioritization may be applied to reduce the number within the set of objects under block 706 to a desired field of choice for the user—for example three to five preferred objects. A set of objects for the subject may thus be generated and weighted according to the measure associated of each object, as in block 710.

Figure 8:
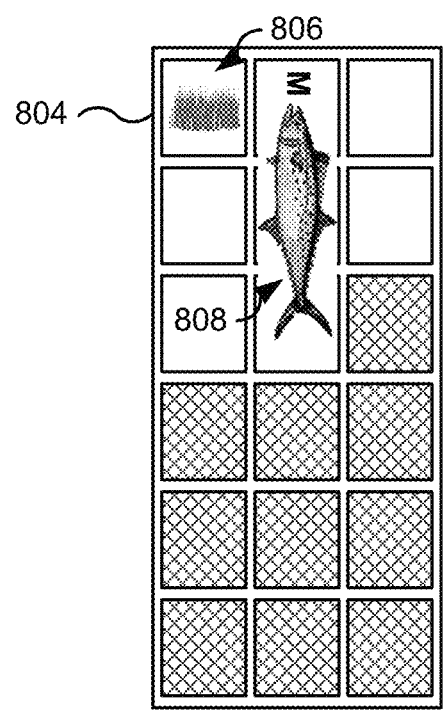
FIG. 8 is a block diagram illustrating a set of potential objects used for creating a face and name association image or user interface in accordance with the present technology.

FIG. 8 is a block diagram illustrating a set of potential objects 804 used for creating a face and name association image in accordance with the present technology. The set of potential objects 804 is depicted as including object 806 which is an image of a lawn and object 808 which is an image of a mackerel fish. The set of potential objects 804 may be determined by the processes of the present technology. In one example, a surname may be the same name of animal such as Fox, Hare, Crow, etc. In such an example, the name of the person is identical to the name of an animal and an image of the animal may be displayed. This example may extend to other objects including surnames such as Woods. Here the surname Woods may be entered and return images of woods such as a forest with trees. In one embodiment, the name of the person in the image may be put through heuristic logic. For example, the surname Byrd may be put through a heuristic logic algorithm (e.g., replace misspellings and similar sounds) and return the term "bird". The term bird may then be used to return potential images of birds. In other embodiment, a library of existing relationships between names and images may be accessed. For example, a surname may be Armstrong and the library of existing relationships may link the surname Armstrong to images of arms that are flexing with bulging muscles. The set of potential objects 804 may display the objects according the filters, rules, ordering, and priorities. For example, the objects may be prioritized into a list according to whether a given object satisfies a relationship with at least one facial feature of the person's face. In another example, the objects are filtered based in part on whether each object in the set of objects satisfies a relationship with at least one facial feature in the set of facial features. In one specific example, images that resemble hair may be associated with the person's hair in the image, and images such as grass or a lawn may be associated with a person's hair.

Figure 9:
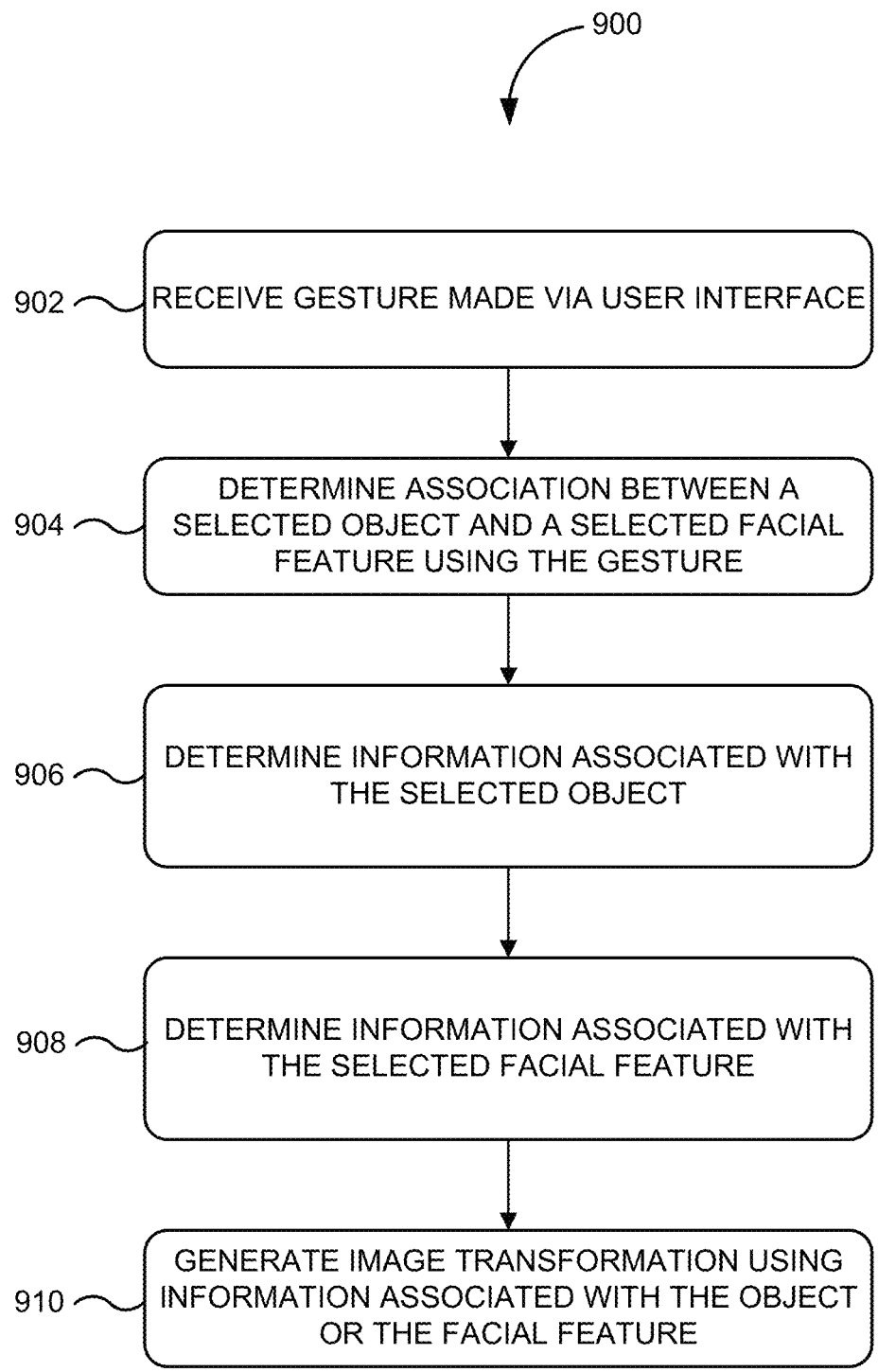
FIG. 9 is a flowchart of an example method for creating a face and name association image or user interface according to an example of the present technology.

FIG. 9 is a flowchart of an example method 900 for creating a face and name association image according to an example of the present technology. The functionality 900 may be implemented as a method and executed as instructions on a machine, where the instructions are included on at least one computer readable medium or one non-transitory machine-readable storage medium. For example, starting in block 902, a gesture may be received made via a user interface.

An association may be determined between a selected object and a selected object and a selected facial feature using the gesture, as in block 904. The gesture may be a drag and drop operation using a mouse or using touch input from a user interacting with a touch screen. Information associated with the selected object may be determined, as in block 906. Information associated with the selected facial feature may be determined, as in block 908. An image transformation, image modification or image overlay may be generated using the information associated with the object or the facial feature, as in block 910. In one embodiment, a shape of the object is conformed to the facial feature. In one embodiment, a shape of the facial feature is conformed to the object. The image transformation may alter or modify the image of the subject's face with an image of the object. In one embodiment, the image of the subject's face is not altered, and the object is place next to the subject's face or layered over the subject's face without altering the image of the subject's face. In one embodiment, the image transformation forms an animation using the second image in order to modify the portion of the first image with the graphical representation of the object.

Figure 10:
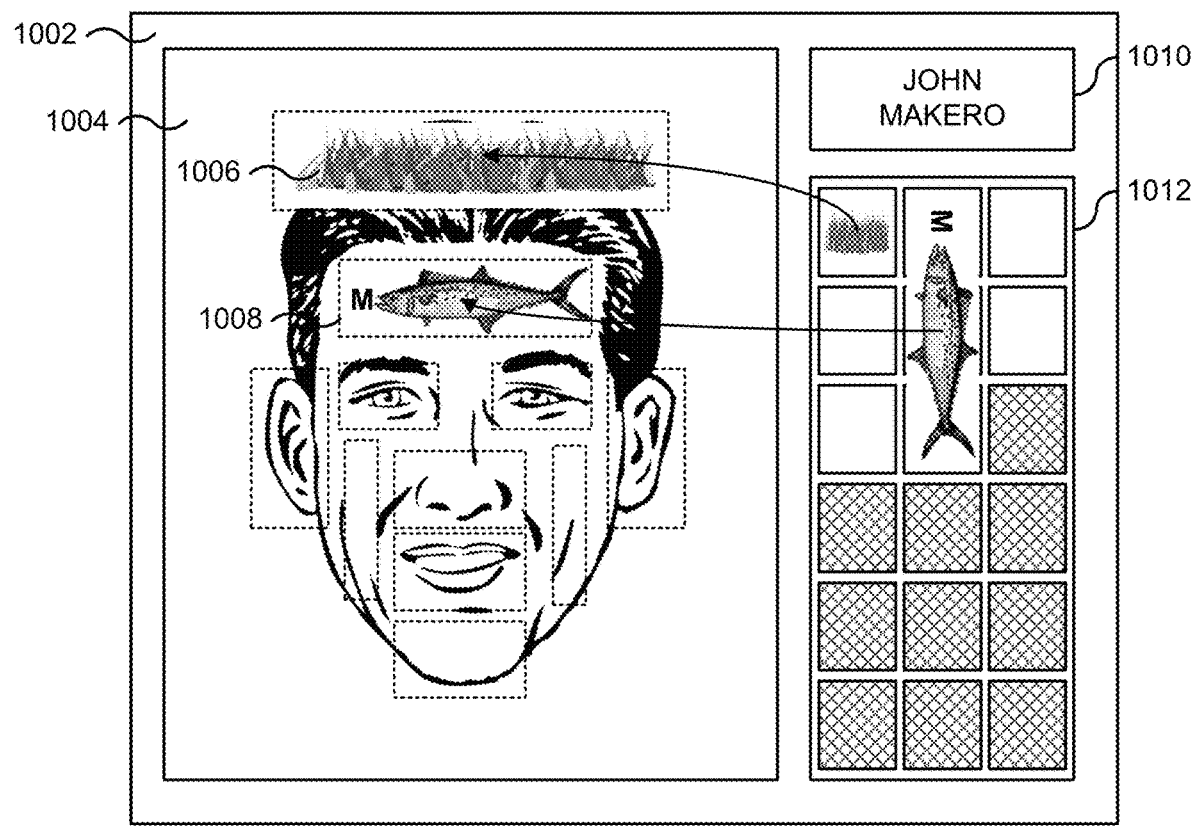
FIG. 10 is a block diagram illustrating an interface used for creating a face and name association image or user interface in accordance with the present technology.

FIG. 10 is a block diagram illustrating an interface 1002 used for creating a face and name association image, display, view, or user interface in accordance with the present technology. The interface 1002 includes a digital image 1004 of a person's face with key features highlighted. The interface includes name information 1010 depicting that the person's name is John Makero. The interface depicts a set of potential objects 1012 depicting several objects includes an image of a lawn and a mackerel fish. An object from the set of potential objects 1012 can be and placed in one of the key features of the person's face or other location on the person's face to create a display or view. For example, FIG. 10 depicts the image of a lawn selected and placed over the hair of the person as depicted in box 1006. The lawn may be selected because lawn rhymes with the name John and is placed over the hair because the blades of grass in the lawn resemble hair. The image of the mackerel fish is also depicted as selected and placed over the person's forehead as shown in box 1008. The mackerel fish may be selected because the word mackerel is similar to the name last name Makero and may be placed over the forehead.

In one aspect, one of the set of potential objects 1012 is selected by a user. The user may select an object and place the object onto a key feature of the person's face using a mouse cursor in an interface such as clicking and dragging. The interface may also employ a touch screen with touch gestures used to select and move object. After at least one object has been selected and placed over the person's face, the processes of the present technology may then blend the selected object together with the image of the person's face to generate a face and name association image that transforms or modifies the image of the person's face. The resulting face and name association image may be employed by a user to remember the name of the person. For example, when the user sees the person in real life, the face and name association image and the memory of the person's name may be triggered.

Figure 11:
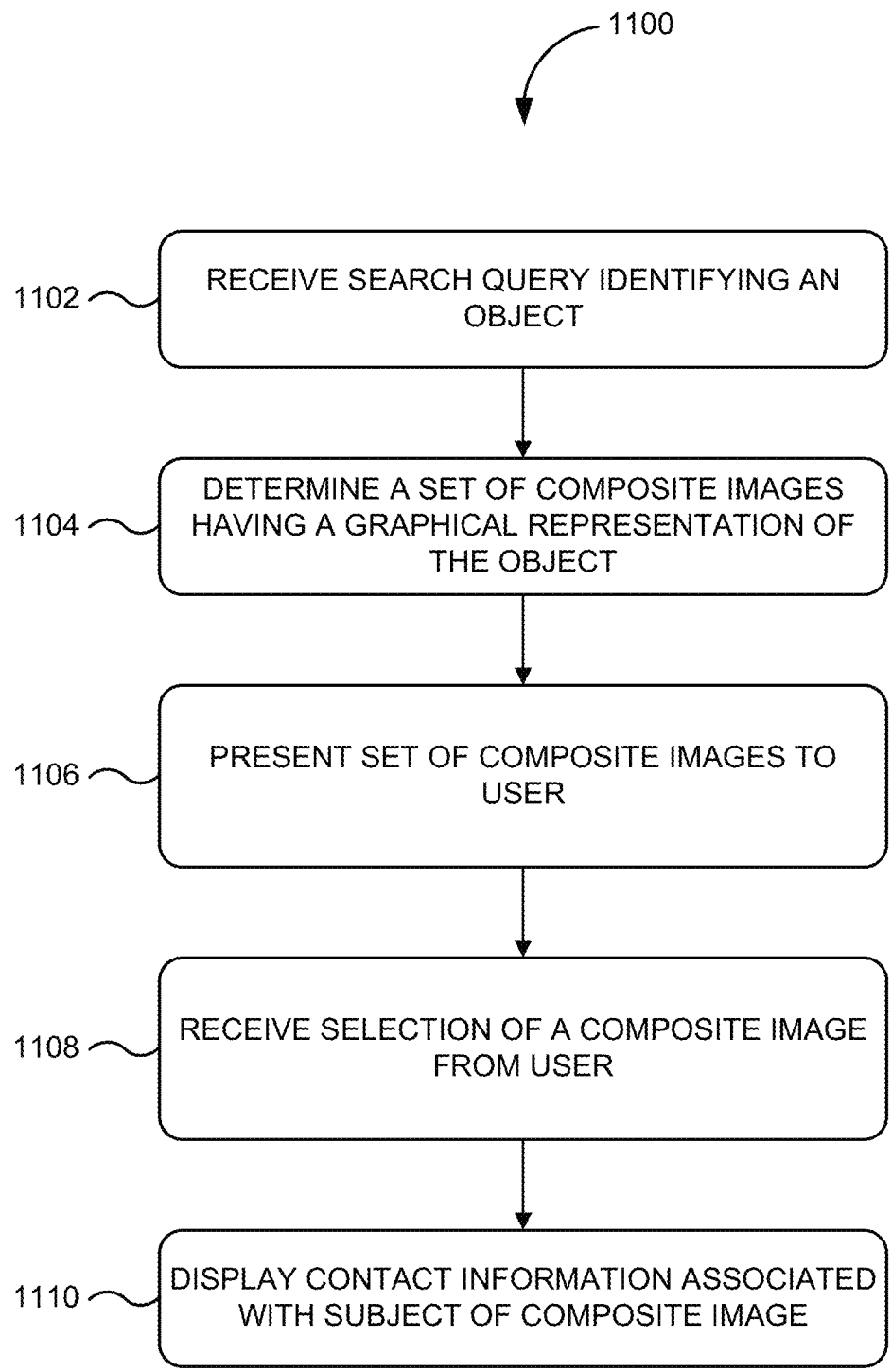
FIG. 11 is a flowchart of an example method for creating a face and name association image or user interface according to an example of the present technology.

FIG. 11 is a flowchart of an example method 1100 for creating a face and name association image according to an example of the present technology. The functionality 1100 may be implemented as a method and executed as instructions on a machine, where the instructions are included on at least one computer readable medium or one non-transitory machine-readable storage medium. For example, starting in block 1102, a search query identifying an object may be received. The search query may be a keyword input by the user. For example, the object may be a specific type of tree such as a willow tree, therefore the user would enter the keywords "willow tree".

A set of composite images having a graphical representation of the object in the key word search may be determined, as in block 1104. The set of composite images may be presented to a user, as in block 1106. The set of composite images may refer to a listing of images that may or may not correspond to one another. A selection of a composite image may be received from the user, as in block 1108. The contact information associated with the subject of the composite image may be displayed, as in block 1110.

Figure 12:
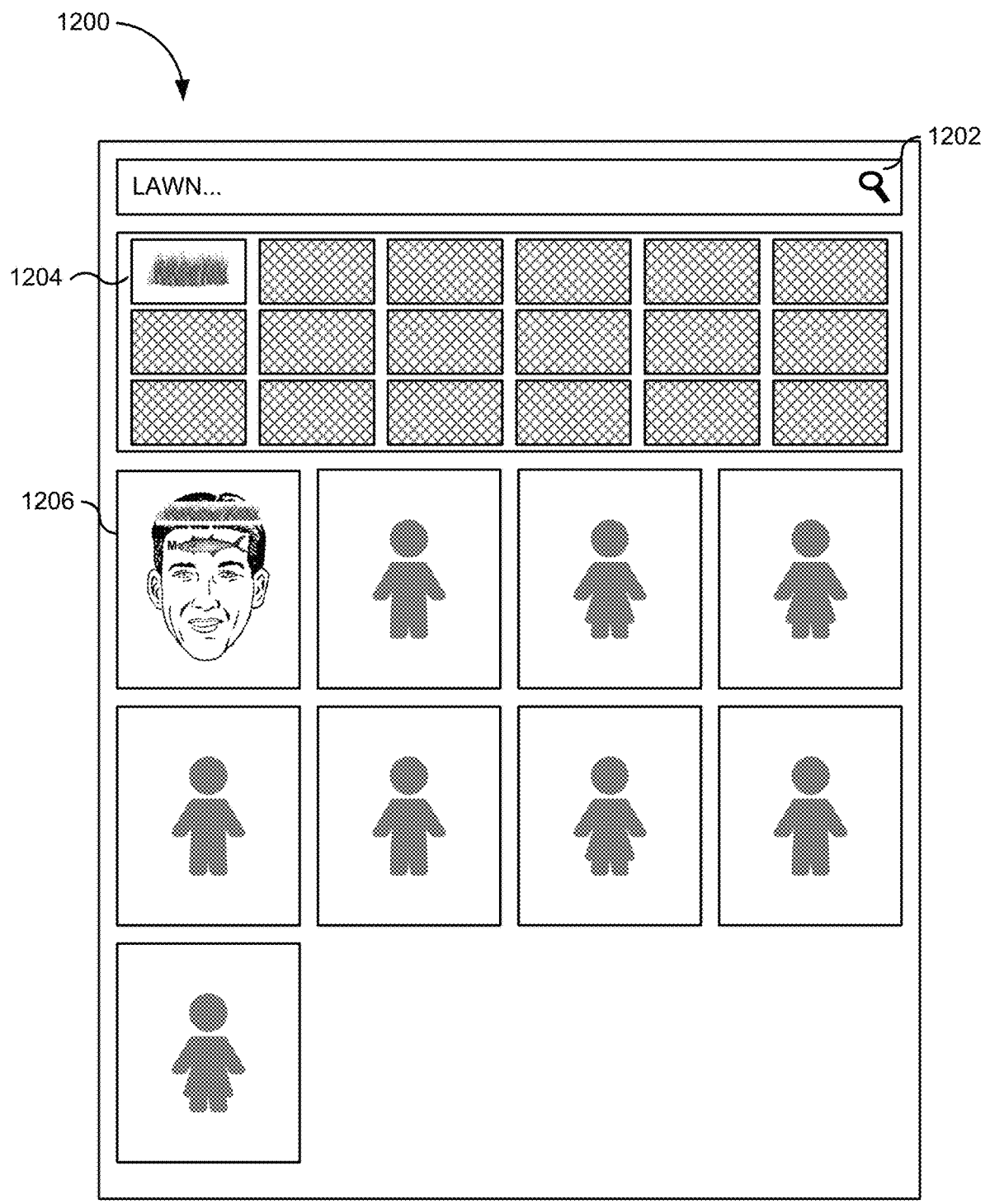
FIG. 12 is a block diagram illustrating an interface used for searching face and name association images in accordance with the present technology.

FIG. 12 is a block diagram illustrating an interface 1200 used for searching face and name association images in accordance with the present technology. The interface may include a search field 1202 which may be employed by a user to enter text for a search query. The search query may be for an object that has been associated with a person that is a contact in a contact list associated with the user. The set of objects 1204 may display objects associated with the text entered for the query. The face and name association image 1206 may represent a search result of a face and name association image that include the object being searched. For example, the text in the search field 1202 is depicted as the word LAWN. The face and name association image 1206 is of an image that has a person's face where the hair of the person has been replaced by an image of a lawn. Thus, by searching for the word LAWN the face and name association image 1206 of John Makero, which was previously generated, may be returned as a search result.

Figure 13:
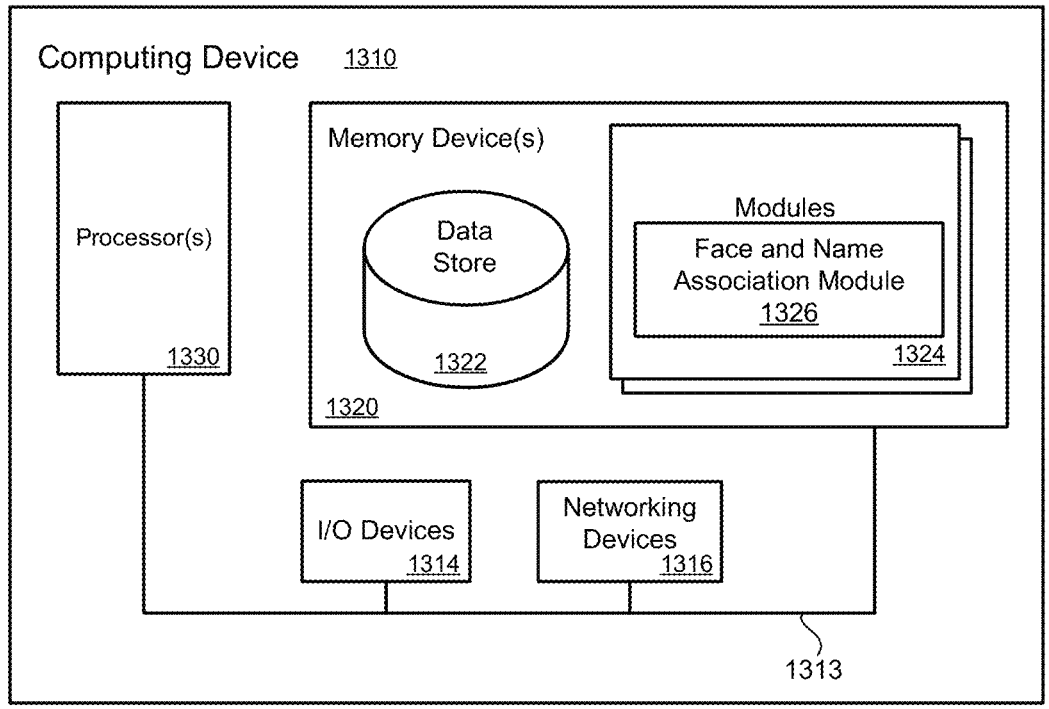
FIG. 13 illustrates a computing device on which modules of this technology may execute.

FIG. 13 illustrates a computing device 1310 on which modules of this technology may execute. A computing device 1310 is illustrated on which a high level example of the technology may be executed. The computing device 1310 may include one or more processors 330 that are in communication with memory devices 1320. The computing device may include a local communication interface 1313 for the components in the computing device. For example, the local communication interface may be a local data bus and/or any related address or control busses as may be desired.

The memory device 1320 may contain modules 1324 that are executable by the processor(s) 1330 and data for the modules 1324. The modules 1324 may execute the functions described earlier. A data store 1322 may also be located in the memory device 1320 for storing data related to the modules 1324 and other applications along with an operating system that is executable by the processor(s) 1330. The data modules 1324 may include face and name associated module 1326 of the present technology. For example, the face and name module 1326 may include the modules described in FIG. 2.

Other applications may also be stored in the memory device 1320 and may be executable by the processor(s) 1330. Components or modules discussed in this description that may be implemented in the form of software using high programming level languages that are compiled, interpreted or executed using a hybrid of the methods.

The computing device may also have access to I/O (input/output) devices 1314 that are usable by the computing devices. An example of an I/O device is a display screen that is available to display output from the computing devices. Other known I/O device may be used with the computing device as desired. Networking devices 1316 and similar communication devices may be included in the computing device. The networking devices 1316 may be wired or wireless networking devices that connect to the Internet, a LAN, WAN, or other computing network.

The components or modules that are shown as being stored in the memory device 1320 may be executed by the processor 1330. The term "executable" may mean a program file that is in a form that may be executed by a processor 1330. For example, a program in a higher level language may be compiled into machine code in a format that may be loaded into a random access portion of the memory device 1320 and executed by the processor 1330, or source code may be loaded by another executable program and interpreted to generate instructions in a random access portion of the memory to be executed by a processor. The executable program may be stored in any portion or component of the memory device 1320. For example, the memory device 1320 may be random access memory (RAM), read only memory (ROM), flash memory, a solid-state drive, memory card, a hard drive, optical disk, floppy disk, magnetic tape, or any other memory components.

The processor 1330 may represent multiple processors and the memory 1320 may represent multiple memory units that operate in parallel to the processing circuits. This may provide parallel processing channels for the processes and data in the system. The local interface 1313 may be used as a network to facilitate communication between any of the multiple processors and multiple memories. The local interface 1313 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:
1. A method, comprising:
   receiving a first image comprising at least a portion of a subject's face;
   determining a set of facial features associated with the subject's face in response to analyzing the first image using a set of visual prominence rules;

determining an object in response to analyzing name data associated with the subject using a set of correspondence rules;

receiving an association between a graphical representation of the object and a facial feature in the set of facial features associated with the subject's face; and generating a memory recall composite comprising a portion of the first image and the graphical representation of the object based in part on the association between the graphical representation of the object and the facial feature associated with the subject's face.

2. The method of claim 1 further comprising determining the object using the set of facial features associated with the subject's face based in part on whether the object satisfies a relationship with at least one facial feature in the set of facial features.

3. The method of claim 1 wherein the object is one of a set of objects and the method further comprises ordering each object in the set of objects into a prioritized list of objects using the set of facial features associated with the subject's face based in part on whether each object in the set of objects satisfies a relationship with at least one facial feature in the set of facial features.

4. The method of claim 1 wherein the object is one of a set of objects and the method further comprises filtering the set of objects into a filtered list of objects using the set of facial features associated with the subject's face based in part on whether each object in the set of objects satisfies a memory triggering relationship with at least one facial feature in the set of facial features.

5. The method of claim 1 further comprising determining the graphical representation for the object based in part on one or more visual characteristics of the subject's face.

6. The method of claim 1 further comprising transforming the portion of the first image with the graphical representation of the object in response to a blend between the facial feature and the graphical representation of the object.

7. The method of claim 1 further comprising transforming the portion of the first image with the graphical representation of the object in response to conforming a shape of the facial feature to the graphical representation of the object.

8. The method of claim 1 further comprising transforming the portion of the first image with the graphical representation of the object in response to conforming a shape of the graphical representation of the object to the facial feature.

9. The method of claim 1 further comprising generating an animation using a second image transforming the portion of the first image with the graphical representation of the object.

10. The method of claim 1 further comprising:
receiving an identifier associated with the object;
determining a plurality of memory recall composites, each memory recall composite in the plurality of memory recall composites including a facial feature having an association with a graphical representation of the object; and
presenting the plurality of images via a user interface.

11. The method of claim 1 further comprising:
receiving a name;
determining a plurality of memory recall composites, each memory recall composite in the plurality of memory recall composites including a graphical representation of the object determined in response to analyzing the name using the set of correspondence rules; and
presenting the plurality of images via a user interface.

12. The method of claim 1 further comprising:
performing a learning phase, comprising:
presenting a second image transforming the portion of the first image with the graphical representation of the object; and
visually emphasizing the graphical representation of the object or the name data;
performing a testing phase, comprising:
presenting, absent the name data, the second image transforming the portion of the first image with the graphical representation of the object;
visually emphasizing the graphical representation of the object;
presenting a plurality of names including a name associated with the name data of the subject;
receiving a selection of at least one of the plurality of names; and
presenting a visual indicator identifying whether the selection corresponds to the name data; and
repeating the learning phase and the testing phase to improve name-face processing of a participant.

13. A computer-implemented method of enhancing recognition of a subject by name or other personal information, comprising:
determining a set of visually distinctive facial features associated with a subject's face using a set of visual prominence rules and a digital photo of the subject's face to process facial features using the set of visual prominence rules;
determining an object using a set of correspondence rules, by accessing name or other personal data associated with the subject that is accessed using contact information for a name that satisfies the set of correspondence rules;
displaying an association interface comprising a visual presentation of the digital photo of the subject's face, the name data associated with the subject, and a graphical representation of the object;
receiving, via the association interface, a correspondence made between a graphical representation of the object and a facial feature in the set of facial features associated with the subject's face; and
generating, based in part on the correspondence between the graphical representation of the object and the facial feature associated with the subject's face, a memory recall composite comprising a modification of a portion of the digital photo of the subject's face having the facial feature with the graphical representation of the object.

14. The computer-implemented method of claim 13 further comprising determining the object using the set of facial features associated with the subject's face based in part on whether the object satisfies a relationship with at least one facial feature in the set of facial features.

15. The computer-implemented method of claim 13 wherein the object is one of a set of objects and the method further comprising ordering each object in the set of objects into a prioritized list of objects within the association interface using the set of facial features associated with the subject's face based in part on whether each object in the set of objects satisfies a relationship with at least one facial feature in the set of facial features.

16. The computer-implemented method of claim 13 wherein the object is one of a set of objects and the method further comprising filtering the set of objects into a filtered list of objects within the association interface using the set of facial features associated with the subject's face based in part on whether each object in the set of objects satisfies a relationship with at least one facial feature in the set of facial features.

17. The computer-implemented method of claim 13 further comprising determining the graphical representation for the object based in part on one or more visual characteristics of the subject.

18. A mobile device, comprising:
a touchscreen display device;
a processor; and
a memory in communication with the processor and storing instructions which when executed by the processor cause the processor to:
   receive, at an application executing on the mobile devices, name data associated with a subject;
   receive, at the application, a first image associated with a subject;
   determine a set of visually distinctive facial features associated with the subject's face in a portion of the first image in response to analyzing, using a set of visual prominence rules, the first image for facial features that satisfy the set of visual prominence rules;
   determine an object in response to analyzing, using a set of visual and auditory correspondence rules, the name data for a name that satisfies the set of visual and auditory correspondence rules;
   display, using the touchscreen display device, a user interface comprising the first image, the name, a graphical representation of each object in a set of objects;
   receive, via the user interface, a touchscreen gesture dragging a graphical representation of an object in the set of objects onto a location of the first image having a facial feature in the set of facial features associated with the subject's face;
   generate a memory recall composite comprising a modification of the first image at the location having the facial feature with the graphical representation of the object; and
   display, using the touchscreen display device, the memory recall composite in conjunction with the name data.

19. The mobile device of claim 18 wherein the instructions which when executed by the processor further cause the processor to:
   determine the object using the set of facial features based in part on whether the object satisfies a relationship with at least one facial feature in the set of facial features; and
   order the set of objects into a prioritized list of objects using a visual prominence weight associated with one or more facial features in the set of facial features.

20. The mobile device of claim 18 wherein the instructions which when executed by the processor further cause the processor to:
   perform a learning phase, comprising:
      present the memory recall composite transforming the portion of the first image with the graphical representation of the object; and
      visually emphasize the graphical representation of the object or the name data;
   performing a testing phase, comprising:
      present, absent the name data, the memory recall composite transforming the portion of the first image with the graphical representation of the object;
      visually emphasize the graphical representation of the object;
      presenting a plurality of names including a name associated with the name data of the subject;
      receive a selection of at least one of the plurality of names; and
      present a visual indicator identifying whether the selection corresponds to the name data; and
   repeat the learning phase and the testing phase to improve name-face processing of a participant.

* * * * *